US012793464B2

(12) United States Patent
Lee et al.

(10) Patent No.: US 12,793,464 B2
(45) Date of Patent: Nov. 10, 2026

(54) METHOD AND DEVICE FOR PROVIDING FEATURE VECTOR TO IMPROVE FACE RECOGNITION PERFORMANCE OF LOW-QUALITY IMAGE

(71) Applicant: GWANGJU INSTITUTE OF SCIENCE AND TECHNOLOGY, Gwangju (KR)

(72) Inventors: Kyoobin Lee, Gwangju (KR); Sungho Shin, Gwangju (KR); Joosoon Lee, Gwangju (KR); Junseok Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 286 days.

(21) Appl. No.: 18/236,299

(22) Filed: Aug. 21, 2023

(65) Prior Publication Data

US 2024/0071134 A1 Feb. 29, 2024

(30) Foreign Application Priority Data

Aug. 25, 2022 (KR) ........................ 10-2022-0107131

(51) Int. Cl.
*G06V 40/16* (2022.01)
*G06V 10/77* (2022.01)
*G06V 10/82* (2022.01)

(52) U.S. Cl.
CPC ........ *G06V 40/172* (2022.01); *G06V 10/7715* (2022.01); *G06V 10/82* (2022.01)

(58) Field of Classification Search
CPC .. G06V 10/7715; G06V 10/774; G06V 10/82; G06V 40/168; G06V 40/172
See application file for complete search history.

(56) References Cited

FOREIGN PATENT DOCUMENTS

| | | | |
|---|---|---|---|
| JP | 2021-518597 | A | 8/2021 |
| KR | 10-2016-0005723 | A | 1/2016 |
| KR | 10-2017-0070114 | A | 6/2017 |

OTHER PUBLICATIONS

Ge et al, "Efficient Low-Resolution Face Recognition via Bridge Distillation", IEEE, 2020 (Year: 2020).*
Ullah et al, "Robust Face Recognition Method for Occluded and Low-Resolution Images", 2019 (Year: 2019).*
Office Action dated Nov. 22, 2024 for corresponding Korean Patent Application No. 10-2022-0107131, along with an English machine translation (13 pages).

(Continued)

*Primary Examiner* — Ruiping Li
(74) *Attorney, Agent, or Firm* — Hauptman Ham, LLP

(57) ABSTRACT

The present disclosure relates to a feature vector transfer method including training a high-quality face recognition network for recognizing a human face based on a high-quality image including the human face, extracting a first feature vector associated with the high-quality image from the high-quality face recognition network, transferring the extracted first feature vector onto a low-quality face recognition network for recognizing the human face based on a low-quality image including the human face, and training the low-quality face recognition network using the transferred first feature vector.

5 Claims, 9 Drawing Sheets

(56) References Cited

OTHER PUBLICATIONS

Peiying Li et al., "Deep Rival Penalized Competitive Learning for Low-resolution Face Recognition", arXiv:2108.01286v1 [cs.CV], Aug. 3, 2021 (31 pages), cited in NPL No. 1.

Sangwon Jung et al., "Fair Feature Distillation for Visual Recognition", the Computer Vision Foundation on IEEE Xplore, pp. 12115-12124, Dec. 31, 2021 (10 pages), cited in NPL No. 1.

* cited by examiner

FIG. 4

400

| Resolution | Method | Distill Type | Loss Func | Ver-ACC(%) (AgeDB-30) | ID-ACC(%) (MegaFace) |
|---|---|---|---|---|---|
| 1× | Base | - | - | 93.78 | 86.66 |
| 2× | Base | - | - | 92.42 | 80.90 |
| | KD[7] | L | L2 | 92.50 | 80.27 |
| | F-KD[4] | F | L2 | 92.43 | 80.95 |
| | AT[3] | SA | L2 | 92.60 | 80.71 |
| | RKD[1] | F | L1+Hubber | 93.00 | 82.26 |
| | A-SKD[] | SA+CA | Cosine | 93.40 | 83.29 |
| | F-SKD(Ours) | F | Cosine | **93.51** | **84.98** |
| 4× | Base | - | - | 87.38 | 57.65 |
| | KD[7] | L | L2 | 87.68 | 57.34 |
| | F-KD[4] | F | L2 | 87.53 | 56.14 |
| | AT[3] | SA | L2 | 87.53 | 57.37 |
| | RKD[1] | F | L1+Hubber | 88.16 | 58.43 |
| | A-SKD[] | SA+CA | Cosine | 88.76 | 61.80 |
| | F-SKD(Ours) | F | Cosine | **89.35** | **63.00** |
| 8× | Base | - | - | 77.28 | 20.90 |
| | KD[7] | L | L2 | 77.12 | 21.86 |
| | F-KD[4] | F | L2 | 76.83 | 19.36 |
| | AT[3] | SA | L2 | 77.03 | 19.78 |
| | RKD[1] | F | L1+Hubber | 77.51 | 21.54 |
| | A-SKD[] | SA+CA | Cosine | 78.10 | 24.06 |
| | F-SKD(Ours) | F | Cosine | **79.08** | **25.18** |

METHOD AND DEVICE FOR PROVIDING FEATURE VECTOR TO IMPROVE FACE RECOGNITION PERFORMANCE OF LOW-QUALITY IMAGE

CROSS-REFERENCE TO RELATED APPLICATION

This application claims priority under 35 U.S.C. § 119 to Korean Patent Application No. 10-2022-0107131, filed on Aug. 25, 2022, in the Korean Intellectual Property Office (KIPO), the disclosure of which is incorporated by reference herein in its entirety.

TECHNICAL FIELD

The present disclosure relates to a feature vector transfer method and a feature vector transfer device for improving face recognition performance of a low-quality image, and more particularly, to a method and device for transferring a feature vector using knowledge distillation.

BACKGROUND

In the field of computer vision, face recognition for identifying people included in an image is an important task. For example, a trained machine learning model may receive an image containing people's faces, and detect and identify people's faces within the received image. In general, high-quality images in which people's faces are clearly displayed are required for such face recognition. On the other hand, when using low-quality images, accuracy of face recognition is significantly reduced.

Meanwhile, research to improve the accuracy of face recognition using low-quality images has been continued. For example, there is a method of using a network that converts a low-quality image into a high-quality image, such as super resolution (SR), and then performing face recognition using the converted high-quality image. However, in the case of this method, there is an issue in that a larger capacity network is additionally required for quality conversion.

SUMMARY

The present disclosure provides a method, a non-transitory computer readable medium storing instructions, and a device (system) for feature vector transfer for solving the above issues.

The present disclosure may be implemented in a variety of ways, including a method, device (system), or non-transitory computer readable medium storing instructions.

According to an example embodiment of the present disclosure, a feature vector transfer method for improving face recognition performance of a low-quality image performed by at least one processor, includes training a high-quality face recognition network for recognizing a human face based on a high-quality image including the human face, extracting a first feature vector associated with the high-quality image from the high-quality face recognition network, transferring the extracted first feature vector onto a low-quality face recognition network for recognizing the human face based on a low-quality image including the human face, and training the low-quality face recognition network using the transferred first feature vector.

According to an example embodiment of the present disclosure, the training of the low-quality face recognition network includes extracting a second feature vector from the low-quality face recognition network, and training the low-quality face recognition network so that a direction of the second feature vector becomes similar to a direction of the first feature vector by using knowledge distillation.

According to an example embodiment of the present disclosure, the training of the low-quality face recognition network so that the direction of the second feature vector becomes similar to the direction of the first feature vector includes training the low-quality face recognition network using a sum of a face recognition loss and a distillation loss in the low-quality face recognition network.

According to an example embodiment of the present disclosure, acquiring the high-quality image including the human face, performing downsampling on the acquired high-quality image, performing blur processing on the downsampled image, and generating the low quality image by changing a size of the blurred image to a size corresponding to the high quality image are further included.

According to an example embodiment of the present disclosure, extracting a first attention map associated with the high-quality image from the trained high-quality face recognition network, and transferring the extracted first attention map onto the low-quality face recognition network for recognizing the human face based on the low-quality image including the human face are further included. The training of the low-quality face recognition network further includes training the low-quality face recognition network using the transferred first feature vector and the first attention map.

According to an example embodiment of the present disclosure, the training of the low-quality face recognition network further includes extracting a second attention map from the low-quality face recognition network, and training the low-quality face recognition network so that the second attention map becomes similar to the first attention map by using knowledge distillation.

According to an example embodiment of the present disclosure, the high-quality face recognition network includes a plurality of blocks for extracting the first feature vector of the high-quality image and a plurality of attention modules for extracting the first attention map.

A non-transitory computer-readable recording medium storing instructions for executing the above-described method according to an example embodiment of the present disclosure in a computer is provided.

In various example embodiments of the present disclosure, since the low-quality face recognition network can, even when using a low-quality image, extract a feature vector having a direction similar to the direction of the feature vector corresponding to a high-quality image, it is possible to effectively improve the accuracy of face recognition using the low-quality image.

In various example embodiments of the present disclosure, the low-quality face recognition network may receive an attention map along with the feature vector from the high-quality face recognition network, and by performing training to increase the similarity of the feature vector and the attention map, face recognition may be performed with higher performance.

In various example embodiments of the present disclosure, the computing device may effectively improve the performance of the low-quality face recognition network without additional parameters during training and without slowdown during inference. In other words, the size of the inference network model does not increase before and after knowledge transfer, and accordingly, the computing device may perform face recognition with high accuracy by utilizing only the low-quality face recognition network in which the knowledge transfer is completed in an inference stage.

In various example embodiments of the present disclosure, due to the low computing power included in driving robots, etc., even when only a low-quality image is received, the low-quality face recognition network may generate a precise second feature vector and a second attention map, and accordingly, the face included in the low-quality image may be more accurately recognized. In other words, the low-quality face recognition network may perform high-performance face recognition using an image taken from a low-quality image sensor.

In various example embodiments of the present disclosure, since the low-quality face recognition network can be used to build an operating system using low-cost IoT sensors in many robots and edge devices, it is possible to effectively reduce hardware costs.

Effects of the present disclosure are not limited to the above-mentioned effects, and other effects not mentioned may be clearly understood from the description of the claims to a person skilled in the art to which the present disclosure pertains (hereinafter, referred to as "a person skilled in the art").

BRIEF DESCRIPTION OF THE DRAWINGS

Example embodiments of the present disclosure will be described with reference to the accompanying drawings, in which like reference numerals refer to like components, but are not limited thereto.

FIG. 4 is an exemplary table illustrating a performance of a low-quality face recognition network trained to increase a similarity of a feature vector according to an example embodiment of the present disclosure.

DETAILED DESCRIPTION

Figure 1:
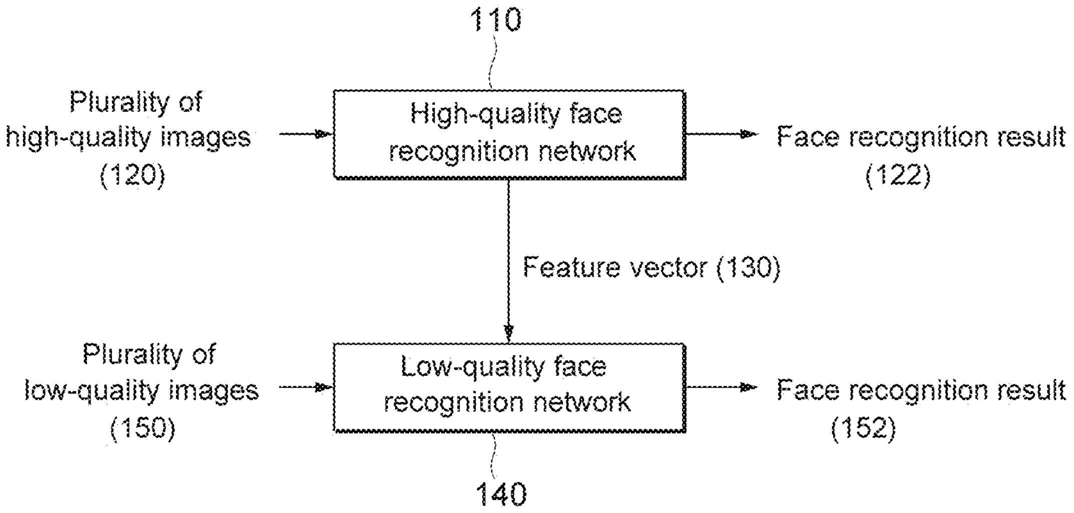
FIG. 1 is a diagram illustrating an example in which a feature vector is transferred between networks according to an example embodiment of the present disclosure.

Hereinafter, example embodiments for implementation of the present disclosure will be described in detail with reference to the accompanying drawings. However, in the following description, if there is a risk of unnecessarily obscuring the gist of the present disclosure, a specific description of a well-known function or configuration will be omitted.

In the accompanying drawings, like reference numerals refer to like components. In addition, in the description of the following example embodiments, redundant description of the same or corresponding components may be omitted. However, even if the description of the component is omitted, it is not intended that such a component is not included in any embodiment.

Advantages and features of embodiments disclosed herein, and methods for achieving them, will be clarified with reference to the example embodiments described below with the accompanying drawings. However, the present disclosure is not limited to the example embodiments disclosed below, but may be implemented in various different forms, and the example embodiments are provided merely to fully inform a person skilled in the art of the scope of the invention related to the present disclosure.

Terms used herein will be briefly described, and disclosed example embodiments will be described in detail. The terms used herein have been selected from general terms that are currently widely used as much as possible while considering the functions in the present disclosure, but they may vary according to the intention of a person skilled in the art, a precedent, or emergence of new technologies. In addition, in certain cases, some terms are arbitrarily selected by the applicant, and in this case, their meanings will be described in detail in the description of the invention. Therefore, the term used in the present disclosure should be defined based on the meaning of the term and the overall content of the present disclosure, not just the name of the term.

In the specification, singular expressions are intended to include plural expressions, unless the context clearly indicates otherwise. In addition, plural expressions include singular expressions, unless the context clearly indicates otherwise. When it is described that a part comprises a component in the entire specification, this means that the part may further include other components without excluding other components, unless specifically stated to the contrary.

In the present disclosure, the terms such as "comprise" and/or "comprising" specify the presence of stated features, steps, operations, elements, and/or components, but do not preclude the addition of one or more other features, steps, operations, elements, components, and/or combinations thereof.

In the present disclosure, when it is mentioned that one component is "coupled", "combined", or "connected" with or "reacts" to another component, the component may be directly coupled, combined, or connected with and/or react to the other component, but is not limited thereto. For example, there may be one or more intermediate components between the component and the other component. In addition, in the present disclosure, the term "and/or" may include each of one or more items listed or a combination of at least a portion of one or more items.

In the present disclosure, terms such as "first" and "second" are used to distinguish one component from another component, and the components are not limited by the terms. For example, a "first" component may be used to refer to an element of the same or similar form as a "second" component.

In the present disclosure, the term "knowledge distillation" may refer to a technique of improving the performance of a small model by transferring learned knowledge of a large model to a small model. For example, knowledge distillation may be performed using a loss function or the like.

In the present disclosure, the term "face recognition network" may refer to a machine learning model, an artificial neural network, or the like for analyzing an image and identifying a person included in the image.

In the present invention, the term "attention map" may refer to a matrix and/or a visualized image representing specific areas (e.g., eyes, nose, ears, mouth, etc.) that affect face recognition among all areas in an image. For example, the attention map may include a plurality of initial attention maps. In addition, the attention map may include an attention map extracted from one image or a plurality of attention maps extracted from a plurality of images. In addition, in the present disclosure, the attention value may include a numerical value, a vector, and the like associated with the attention map.

In the present disclosure, the term "attention module" may refer to a module for extracting an attention map from an image associated with a block. For example, the attention module may include a channel attention module (CAM), a spatial attention module (SAM), a convolution block attention module (CBAM), and the like, but is not limited thereto.

In the present disclosure, the term "loss" and/or "loss function" may refer to a scale, function, etc., for measuring an error of an object in a machine learning model or the like. A machine learning model or the like may be trained to reduce the error produced by the loss function. For example, the loss function may include face recognition loss, distillation loss, and the like. Here, the face recognition loss function may include a softmax loss function, a distance-based loss function, an angular margin-based loss function (sphereface, cosface, arcface), and the like.

FIG. 1 is a diagram illustrating an example in which a feature vector 130 is transferred between networks (110 and 140) according to an example embodiment of the present disclosure. According to an example embodiment, the face recognition networks (110 and 140) may refer to networks for recognizing and specifying a person included in an image using the image including a human face, and may be implemented as a machine learning model or the like. For example, the face recognition networks (110 and 140) may specify the person included in the image using features such as the position, size, color, shape of the person's ears, eyes, mouth, and nose, and spacing between the ears, eyes, mouth, and nose, but the present disclosure is not limited thereto.

In the illustrated example, a high-quality face recognition network 110 for specifying a person included in an image using a high-quality image and a low-quality face recognition network 140 for specifying a person included in an image using a low-quality image may exist. In general, specifying a person through the low-quality image may be less accurate than specifying a person through the high-quality image. For example, in the case of the low-quality image, it may be difficult to accurately specify the location, size, color, and the like of the person's ears, eyes, mouth, and nose.

According to an example embodiment, the high-quality face recognition network 110 may be trained to receive a plurality of high-quality images 120 as input and output a face recognition result 122. For example, the high-quality face recognition network 110 may be composed of a machine learning model including a plurality of blocks (e.g., a plurality of convolutional blocks) for extracting the feature vector 130 of the plurality of high-quality images 120 and a plurality of attention modules for extracting an attention map. The high-quality face recognition network 110 may be trained to recognize human faces using the feature vector extracted from the high-quality image.

As described above, when training of the high-quality face recognition network 110 is in progress or training is completed, the feature vector 130 associated with the plurality of high-quality images 120 may be extracted from the high-quality face recognition network 110. In addition, the feature vector 130 extracted in this way may be transferred onto the low-quality face recognition network 140. Here, the low-quality face recognition network 140 may be trained to receive a plurality of low-quality images 150 as input and output a face recognition result 152, and the feature vector 130 transferred in the training process may be used. For example, the low-quality face recognition network 140 may be trained by receiving the feature vector 130 through knowledge distillation.

According to an example embodiment, the low-quality face recognition network 140 may extract a feature vector associated with the plurality of low-quality images 150. In this case, training may be performed so that the extracted feature vector has high similarity with the feature vector 130 transferred from the high-quality face recognition network 110. For example, the feature vector may be configured to have a direction and a size, and performing training to increase similarity may refer to performing similarity so that the direction except for the size of the feature vector becomes similar. In other words, face recognition performance of the low-quality face recognition network 140 may be improved when training is performed to make the direction of the feature vector similar compared to that of when training is performed to make both the direction and size of the feature vector similar.

With such a configuration, even when using a low-quality image, the low-quality face recognition network 140 may extract a feature vector having a direction similar to that of the feature vector corresponding to the high-quality image, and thus, the accuracy of face recognition using a low-quality image may be effectively improved.

Figure 2:
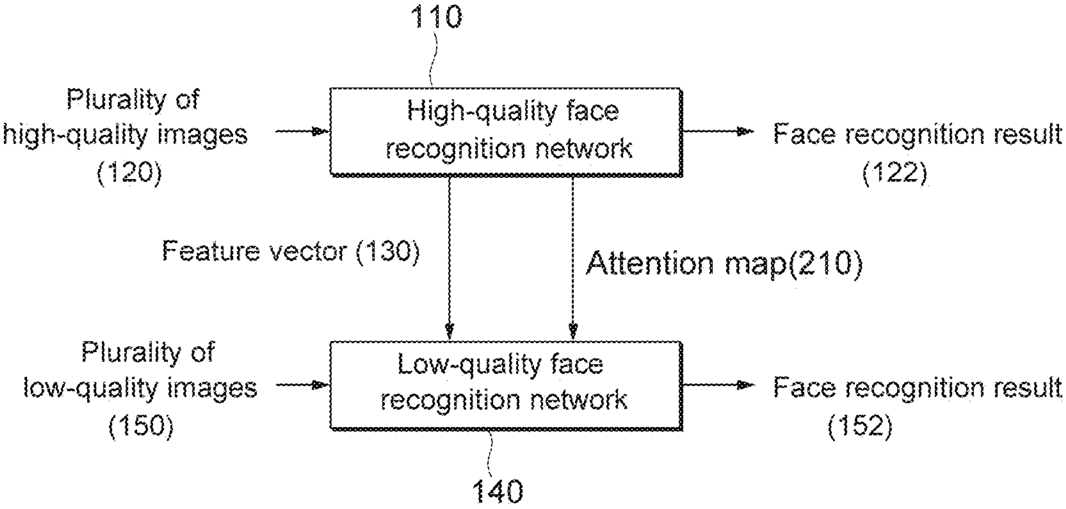
FIG. 2 is a diagram illustrating an example in which a feature vector and an attention map are transferred between networks according to an example embodiment of the present disclosure.

FIG. 2 is a diagram illustrating an example in which the feature vector 130 and an attention map 210 are transferred between the networks (110 and 140) according to an example embodiment of the present disclosure. As described above in FIG. 1, the extracted feature vector 130 from the high-quality face recognition network 110 may be provided to the low-quality face recognition network 140. Additionally, the attention map 210 extracted from the high-quality face recognition network 110 may be provided to the low-quality face recognition network 140.

As described above, the high-quality face recognition network 110 may be trained to receive a plurality of high-quality images 120 as input and output the face recognition result 122. For example, the high-quality face recognition network 110 may be composed of a machine learning model including a plurality of blocks for extracting the feature vector 130 of the plurality of high-quality images 120 and a plurality of attention modules for extracting the attention map 210. Here, the attention map may refer to a matrix representing specific areas (e.g., eyes, nose, ears, mouth, etc.) that affect face recognition among all areas in the image and/or a visualized image. In other words, the high-quality face recognition network 110 may be trained to generate the attention map 210 based on the plurality of blocks and the plurality of attention modules, and recognize a human face based on the generated attention map 210.

When training of the high-quality face recognition network 110 is in progress or training is completed, the attention map 210 associated with the plurality of high-quality images 120 may be extracted from the trained high-quality face recognition network 110. In addition, the attention map 210 extracted in this way may be transferred onto the low-quality face recognition network 140. Here, the low-quality face recognition network 140 may be trained to receive a plurality of low-quality images 150 as input and output a face recognition result 152, and the attention map 210 transferred in the training process may be used. For example, the low-quality face recognition network 140 may be trained by receiving the attention map 210 through knowledge distillation.

According to an example embodiment, the low-quality face recognition network 140 may be composed of a machine learning model including a plurality of blocks (e.g., a plurality of convolutional blocks) and a plurality of attention modules for extracting an attention map suitable for features extracted from each convolutional block. In other words, like the high-quality face recognition network 110, the low-quality face recognition network 140 may be trained to generate attention maps based on the plurality of blocks and the plurality of attention modules, and recognize a human face based on the generated attention map.

In general, when a low-quality image is used, the accuracy of the attention map may be reduced compared to when a high-quality image is used. In this regard, in order to improve the accuracy of the attention map, the attention map extracted from the low-quality face recognition network 140 may be learned to be similar to the attention map 210 transferred from the high-quality face recognition network 110. For example, the attention map may be learned to be similar to the attention map 210 using a specific loss function.

With this configuration, the low-quality face recognition network 140 may receive the attention map 210 together with the feature vector 130 from the high-quality face recognition network 110, and by performing training to increase the similarity of the feature vector 130 and the attention map 210, face recognition may be performed with higher performance.

Figure 3:
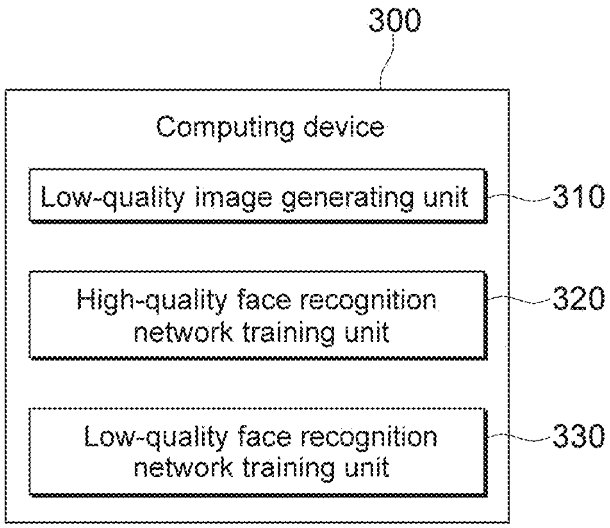
FIG. 3 is a functional block diagram illustrating an internal configuration of a computing device according to an example embodiment of the present disclosure.

FIG. 3 is a functional block diagram illustrating an internal configuration of a computing device 300 according to an example embodiment of the present disclosure. As shown, the computing device 300 may include a low-quality image generating unit 310, a high-quality face recognition network training unit 320, a low-quality face recognition network training unit 330 and the like, but is not limited thereto. For example, the computing device 300 may communicate with an external device, a database, etc., and receive an image for training the network.

According to an example embodiment, the low-quality image generating unit 310 may generate a low-quality image using a high-quality image. For example, in order to train so that the feature vector and/or attention map generated by the high-quality face recognition network become similar to the feature vector and/or attention map generated by the low-quality face recognition network, the image used to extract corresponding feature vector and/or attention map may be an image containing the same shape but of a different quality. In other words, when only a high-quality image exists, the low-quality image generating unit 310 may generate a low-quality image by changing the quality of the corresponding image.

The low-quality image generating unit 310 may acquire a high-quality image including a human face and perform downsampling on the acquired high-quality image. Here, downsampling is reducing the ratio, size, etc., of an image, and for example, a high-quality image may be downsampled at a ratio of 2×, 4×, 8×, etc., through interpolation (e.g., bicubic interpolation). In addition, the low-quality image generating unit 310 may perform blur processing on the down-sampled image. For example, a Gaussian blur technique may be applied to the image, but is not limited to this. Then, the low-quality image generating unit 310 may generate a low-quality image by changing the size of the blurred image to a size corresponding to the high-quality image. In other words, the low-quality image generating unit 310 may generate a low-quality image by changing the size of the blurred image to the original size corresponding to the high-quality image through interpolation (e.g., bicubic interpolation).

The high-quality face recognition network training unit 320 may train the high-quality face recognition network for recognizing a human face based on a high-quality image including a human face. For example, the high-quality face recognition network may include a plurality of blocks (e.g., convolutional blocks) that are sequentially connected, and the high-quality face recognition network training unit 320 may extract a first initial attention map from a first block included in the plurality of blocks and extract a second initial attention map from a second block connected to the first block.

Then, the high-quality face recognition network training unit 320 may use knowledge distillation to train the high-quality face recognition network so that the second initial attention map becomes similar to the first initial attention map. For example, an attention map created or configured in the initial part of a block may include more context information than an attention map created or configured in the later part of the block. Accordingly, the high-quality face recognition network training unit 320 may perform training so that the second initial attention map generated at the back of the block becomes similar to the first initial attention map generated at the front of the block.

According to an example embodiment, the high-quality face recognition network may be trained using a loss function. Here, the high-quality face recognition network training unit 320 may perform training using Equation 1 below.

$$L_{D-T} = \sum_{i=1}^{n} \lambda_i d\left(MaxPool\left(h_{s_i}\right), h_{s_{i+1}}\right) \quad \text{[Equation 1]}$$

Here, $L_{D-T}$ may be the sum of arcface loss and the distillation loss in the high-quality face recognition network, $h_{s_i}$ may refer to the spatial attention value of the $i^{th}$ block of the high-quality face recognition network, d(·) may refer to a distance function for distillation loss, and MaxPool(·) may refer to a max pooling layer. In addition, MaxPool(·) may be the max pooling layer with a 2×2 kernel. For example, the size of the attention map of the $i^{th}$ block constituting the high-quality face recognition network may be twice the size of the $i+1^{th}$ block, and accordingly, the max pooling layer may perform downsampling of the attention map to ½ size.

In addition, the distance function d(·) may be calculated by Equation 2 below.

$$d(x_1, x_2) = \alpha\left(1 - \frac{x_1 \cdot x_2}{\|x_1\|_p \|x_2\|_p}\right) + (1 - \alpha)\|x_1 - x_2\|_p \quad \text{[Equation 2]}$$

Here, the distance function d(·) may be a linear combination of cosine distance and L-P norm, and the L-P norm may include an L1 distance, an L2 distance, and the like. In addition, a may be a weighting element for adjusting the L-P norm and cosine distance. Since the dimension of the attention map becomes smaller from the initial block to the deeper block, the knowledge distillation process may be stabilized by using both the cosine distance and the L-P norm distance. Additionally or alternatively, in FIG. 2, the distance function d(·) has been described as a linear combination of cosine distance and L-P norm, but is not limited thereto, and any distance function and/or a combination thereof may be used depending on the data set.

According to an example embodiment, the low-quality face recognition network training unit 330 may train the low-quality face recognition network with the first feature vector transferred from the high-quality face recognition network. For example, the low-quality face recognition network training unit 330 may extract the second feature vector from the low-quality face recognition network and use knowledge distillation to train the low-quality face recognition network so that the direction of the second feature vector becomes similar to the direction of the first feature vector. In other words, the low-quality face recognition network training unit 330 may improve the recognition performance of the low-quality face recognition network by training so that only the direction of the second feature vector excluding the size of the feature vector to be generated or extracted similar to the direction of the first feature vector.

Additionally or alternatively, the low-quality face recognition network training unit 330 may train the low-quality face recognition network using the first attention map transferred from the high-quality face recognition network. For example, the low-quality face recognition network training unit 330 may extract the second attention map from the low-quality face recognition network and use knowledge distillation to train the low-quality face recognition network so that the second attention map becomes similar to the first attention map. In other words, the low-quality face recognition network training unit 330 may perform network training using either one of the feature vector and the attention map, or both the feature vector and the attention map.

According to an example embodiment, the low-quality face recognition network may be trained using a loss function. Here, the low-quality face recognition network training unit 330 may perform training using the sum of face recognition loss and distillation loss in the low-quality face recognition network. For example, distillation loss may be calculated using Equation 3 below.

$$L_{distillation} = \sum_{i=1}^{n} \lambda_i \frac{d(h_{s_i}, l_{s_i}) + d(h_{c_i}, l_{c_i})}{2} \quad \text{[Equation 3]}$$

Here, $L_{distillation}$ may be the distillation loss in the low-quality face recognition network, $h_{s_i}$ and $l_{s_i}$ may refer to the spatial attention value of the $i^{th}$ block of the high-quality face recognition network and the low-quality face recognition network, $h_{c_i}$ and $l_{c_i}$ may refer to the channel attention value of the $i^{th}$ block of the high-quality face recognition network and the low-quality face recognition network, and $\lambda_i$ may refer to the weight factor of the $i^{th}$ block, and d(·) may refer to the distance function for distillation loss. Using this loss function, the low-quality face recognition network may be trained to focus on the target area among the face areas included in the low-quality image, so that it may be trained to have performance similar to that of a high-quality face recognition network even when only low-quality images are used. Additionally or alternatively, in FIG. 3, the distillation loss was described as calculated using both the spatial attention value and the channel attention value, but is not limited thereto, and the spatial attention value or the channel attention value may be independently transferred, or at least some of the spatial attention value, the channel attention value, and any other attention value may be transferred together.

In FIG. 3, while each functional configuration included in the computing device 300 has been separately described, this is only to help understand the disclosure and two or more functions may be performed in one computing device. In addition, although the computing device 300 has been described in FIG. 3 as training both the high-quality face recognition network and the low-quality face recognition network, it is not limited thereto, and a separate device for training each network may exist. With this configuration, the computing device 300 may effectively improve the performance of the low-quality face recognition network without additional parameters during training and without slowing down during inference. In other words, the size of the inference network model does not increase before and after the knowledge transfer, and accordingly, the computing device 300 may perform face recognition with high accuracy by utilizing only the low-quality face recognition network in which the knowledge transfer is completed in the inference stage.

FIG. 4 is an exemplary table 400 illustrating a performance of a low-quality face recognition network trained to increase a similarity of a feature vector according to an example embodiment of the present disclosure. In the illustrated example, table 400 shows experimental results of measuring recognition performance of the low-quality face recognition network to which various downsampling ratios are applied, and may show performance measurement results using the AgeDB-30 data set and the MegaFace data set. Here, F-SKD (Feature Similarity Knowledge Distillation) may represent feature vector-based knowledge distillation, and A-SKD (Attention Similarity Knowledge Distillation) may represent attention map-based knowledge distillation. In addition, Base may represent a general face recognition network in which knowledge distillation is not performed.

As can be seen in the illustrated table 400, as for face recognition performance using an image downsampled at a 2× ratio, when F-SKD knowledge distillation was performed, Ver-ACC and ID-ACC, which represent verification accuracy and identification accuracy, exhibited the highest performance at 93.51% and 84.98%, respectively. In addition, when using an image downsampled at a 4× ratio, the performance of the F-SKD method was measured at 89.35% and 63%, and when using downsampled images at a 8× ratio, the performance of the F-SKD method was measured at 79.08% and 25.18%. In other words, in all downs ampling ratios, the performance of the F-SKD method was higher than that of other conventional knowledge distillation methods.

In FIG. 4, the performance of using both A-SKD and F-SKD was not measured, but when the two methods are fused to train the low-quality face recognition network, the performance of the low-quality face recognition network trained by the fusion method may be measured the highest.

Figure 5:
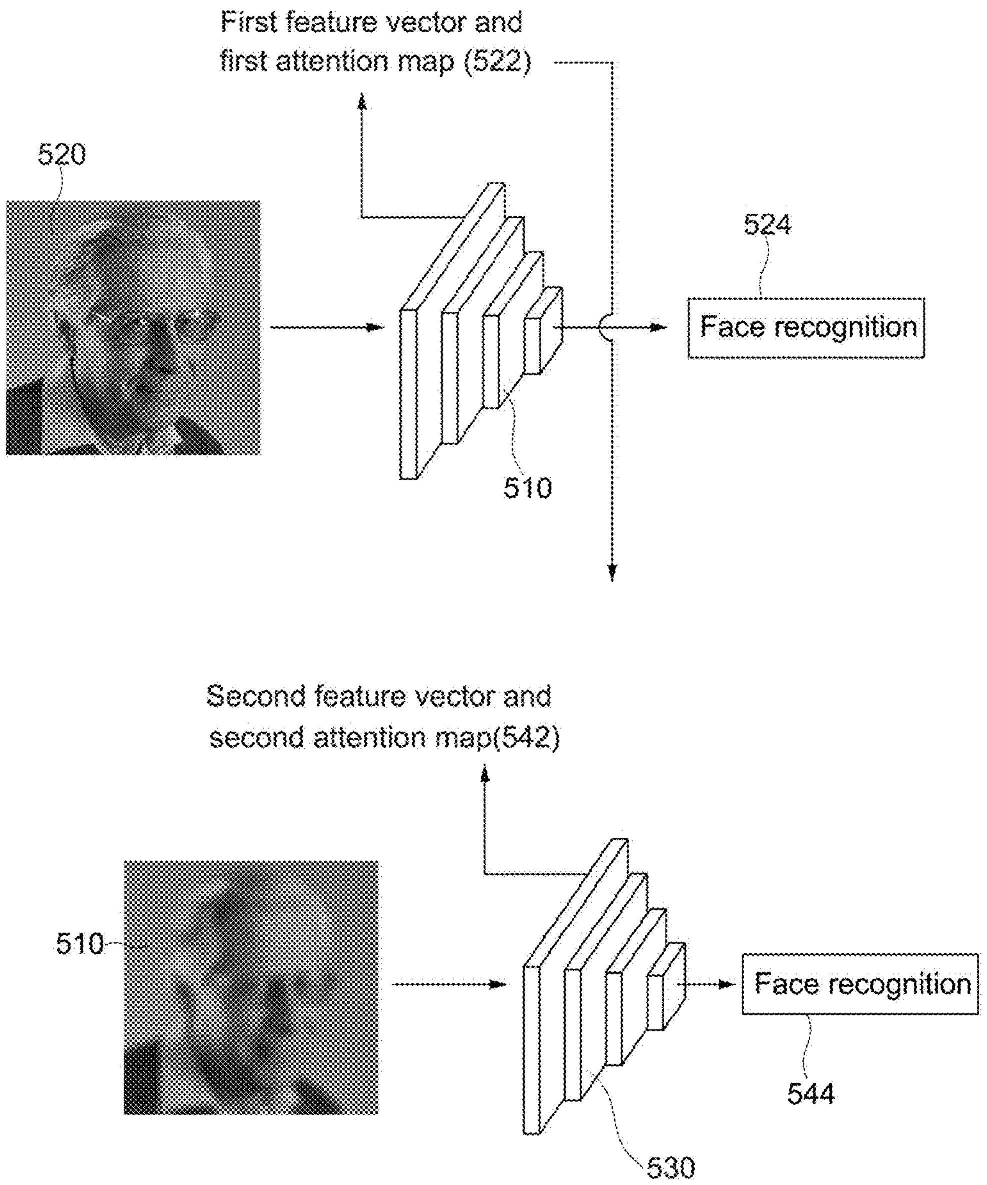
FIG. 5 is a diagram illustrating an example of a high-quality face recognition network and a low-quality face recognition network according to an example embodiment of the present disclosure.

FIG. 5 is a diagram illustrating an example of a high-quality face recognition network 510 and a low-quality face recognition network 530 according to an example embodiment of the present disclosure. As described above, the high-quality face recognition network 510 may be trained to perform face recognition 524 using a high-quality image 520 including a human face. Here, the high-quality face recognition network 510 may include a plurality of blocks for extracting a feature vector of a high-quality image and a plurality of attention modules for extracting an attention map. As described above, the first feature vector and the first attention map 522 associated with the high-quality image 520 may be extracted from the high-quality face recognition network.

According to an example embodiment, the attention map may be used to extract features of a human face by Equation 4 below.

$$F' = F \otimes M(F) \quad \text{[Equation 4]}$$

Here, F may be a feature map extracted from an image, and M(F) may be an attention map extracted from a corresponding image. In addition, F may be a feature map refined to focus on a specific area for face recognition by the attention map.

The attention map may include a channel attention map (CAM) indicating a channel referenced above a specific criterion for face recognition and a spatial attention map (SAM) indicating a feature area referenced above another specific criterion for face recognition. According to an example embodiment, the channel attention map may be generated by the channel attention module using a pooling layer to obtain the activated channel area. When the feature map of the intermediate stage satisfies $F \in C \times H \times W$, the channel attention map may be calculated by Equation 5 below.

$$M_c(F) = \sigma(FC(AvgPool(F)) + FC(MaxPool(F))) = \sigma(W_1(W_0(F_{avg})) + W_1(W_0(F_{max}))) \quad \text{[Equation 5]}$$

Here, σ may refer to a sigmoid function, and FC(·) may refer to a fully connected (FC) layer having weight matrix $W_0 \in C/r \times C$ and $W_1 \in C \times C/r$. In this case, $W_0$ and $W_1$ may be shared in both the pooling layer and the ReLU activation function associated with $W_0$. In addition, r may be a down-sampling ratio, and $F_{avg}$ and $F_{max}$ may refer to outputs of the average pooling layer and the maximum pooling layer, respectively. In addition, MaxPool(·) and Avg Pool(·) may refer to a pooling layer having a 1×1 kernel.

In addition, the spatial attention map may be calculated by the spatial attention module using Equation 6 below.

$$M_s(F) = \sigma\left(f^{7\times7}(AvgPool(F); MaxPool(F))\right) = \sigma\left(f^{7\times7}\left(F^S_{avg}; F^S_{max}\right)\right) \quad \text{[Equation 6]}$$

Here, σ may refer to a sigmoid function, and $F_{avg}$ and $F_{max}$ may refer to outputs of the average pooling layer and the maximum pooling layer, respectively. In addition, $f^{7\times7}(\cdot)$ is a convolution layer having a 7×7 kernel, and may be a layer through which $F_{avg}$ and $F_{max}$ are concatenated and passed.

By the above-described process, the generated first feature vector and the first attention map 522 may be transferred to the low-quality face recognition network 530. Here, the low-quality face recognition network 530 may be a network for performing face recognition 544 using the low-quality image 540. Here, the low-quality image 540 may include the same form and/or shape as the high-quality image 520, but may be an image having different quality. According to an example embodiment, a second feature vector and a second attention map 542 may be extracted from the low-quality face recognition network 530. In this case, the second feature vector and the second attention map 542 may be learned to be similar to the transferred first feature vector and the first attention map 522.

Although it has been described in FIG. 5 that the channel attention map and the spatial attention map are calculated respectively, it is not limited thereto, and the channel attention map and the spatial attention map may be simultaneously generated or calculated by a convolution block attention module (CBAM) or the like. With such a configuration, even when only low-quality images are received due to low computing power included in the driving robot or the like, the low-quality face recognition network 530 may generate a precise second feature vector and a second attention map 542, and accordingly, it is possible to more accurately recognize a face included in a low-quality image. In other words, the low-quality face recognition network 530 may perform high-performance face recognition using an image taken from a low-quality image sensor. In addition, since the low-quality face recognition network 530 may be used to build an operating system using low-cost IoT sensors in many robots and edge devices, hardware costs may be effectively reduced.

Figure 6:
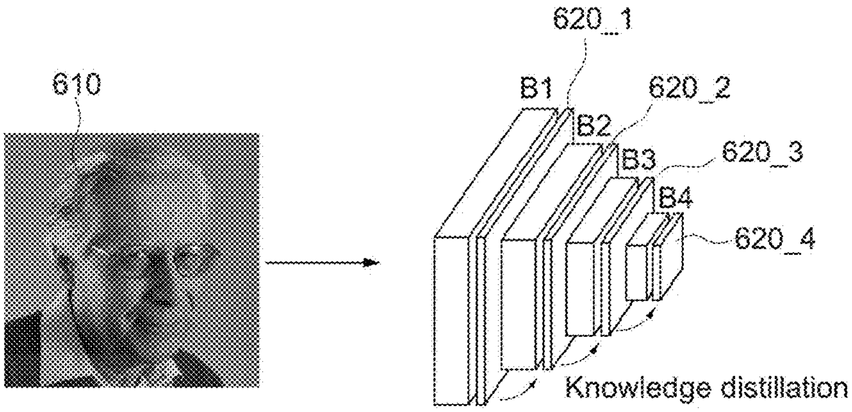
FIG. 6 is a diagram illustrating an example of training a high-quality face recognition network according to an example embodiment of the present disclosure.

FIG. 6 is a diagram illustrating an example of training a high-quality face recognition network according to an example embodiment of the present disclosure. As described above, based on the high-quality image 610 including a human face, the high-quality face recognition network may be trained to recognize the corresponding human face. According to an example embodiment, a high-quality face recognition network may include a plurality of blocks 620 for extracting features of a high-quality image and an attention module corresponding to each block 620 (e.g., a channel attention module, a spatial attention module, a convolution block attention module, etc.). In other words, each block 620 may be associated with an attention module for extracting an attention map. That is, the attention map corresponding to each block 620 may be extracted by the attention module. In addition, the feature vector may be output or extracted by such a block 620 and the attention module.

According to an example embodiment, a first initial attention map may be extracted from the first block (B1) 620_1 included in the plurality of blocks 620_1, 620_2, 620_3, 620_4, and a second initial attention map may be extracted from the second block (B2) 620_2 connected to the first block 620_1. his case, the second initial attention map may be learned to be similar to the first initial attention map by using knowledge distillation.

In the illustrated example, the second initial attention map ($h_{i+1}$) may be learned to be similar to the first initial attention map ($h_i$). In this case, the attention size of the first initial attention map ($h_i$) may be greater than the attention size of the second initial attention map ($h_{i+1}$) by a specific ratio (e.g., 2 times). Therefore, for knowledge distillation, the size of the first initial attention map ($h_i$) may be reduced by a corresponding specific ratio using the max pooling layer.

Then, knowledge distillation may be performed on the first initial attention map ($h_i$) and the second initial attention map ($h_{i+1}$) having the same size.

In FIG. 6, the high-quality face recognition network is illustrated as including four blocks 620 and four attention modules, but is not limited thereto, and any number of blocks and attention modules may be included in the high-quality face recognition network. In addition, it has been described in FIG. 6 that the initial attention map is generated for one high-quality image 610 and knowledge distillation is performed, but is not limited thereto, and knowledge distillation may be performed for each of the plurality of high-quality images.

Figure 7:
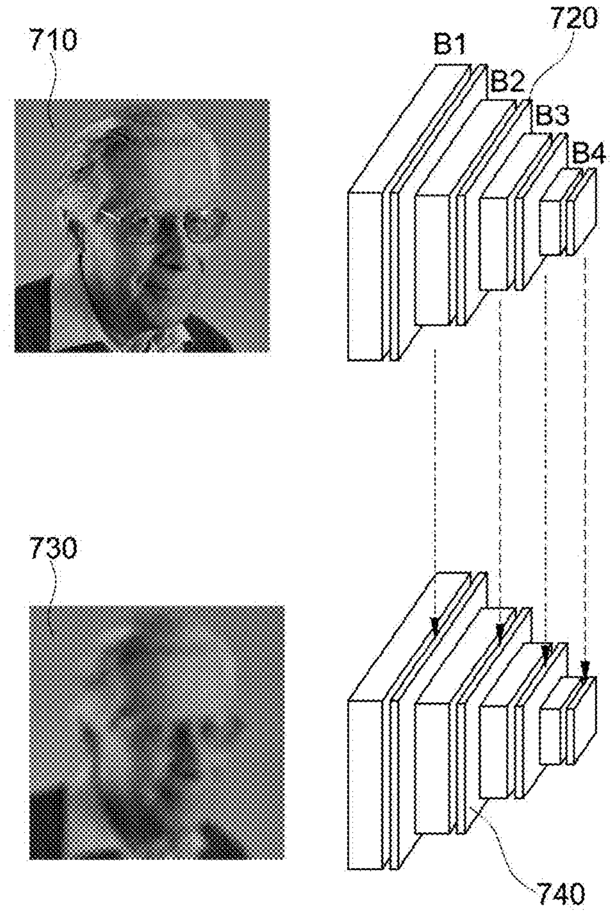
FIG. 7 is a diagram illustrating an example of training a low-quality face recognition network according to an example embodiment of the present disclosure.

FIG. 7 is a diagram illustrating an example of training a low-quality face recognition network 740 according to an example embodiment of the present disclosure. As described above, the high-quality face recognition network 720 may be trained to perform face recognition using the high-quality image 710. In addition, the low-quality face recognition network 740 may be trained to perform face recognition using the low-quality image 730. When trained in this way, a first feature vector and a first attention map associated with the high-quality face recognition network 720 may be generated, and a second feature vector and a second attention map associated with the low-quality face recognition network 740 may be generated.

The low-quality face recognition network (or a plurality of blocks and attention modules included in the low-quality face recognition network) 740 may receive the first feature vector and the first attention map from the high-quality face recognition network (or a plurality of blocks and attention modules included in the high-quality face recognition network) 720 using knowledge distillation. Then, the direction of the second feature vector may be learned to be similar to the direction of the first feature vector, and the second attention map may be learned to be similar to the first attention map.

In FIG. 7, the high-quality face recognition network 720 and the low-quality face recognition network 740 are illustrated as including four blocks and four attention modules, but is not limited thereto, and any number of blocks and attention modules may be included in the network. In addition, in FIG. 7, it has been described that the feature vector and/or an attention map for one image 710, 730 is generated in each network and knowledge distillation is performed, but is not limited thereto, and knowledge distillation may be performed on each of the plurality of images. With such a configuration, the feature vector and/or attention map extracted from the high-quality face recognition network 720 and the feature vector and/or attention map extracted from the low-quality face recognition network 740 may have a significantly high correlation, and accordingly, face recognition may be performed with high accuracy even when using a low-quality image 730.

Figure 8:
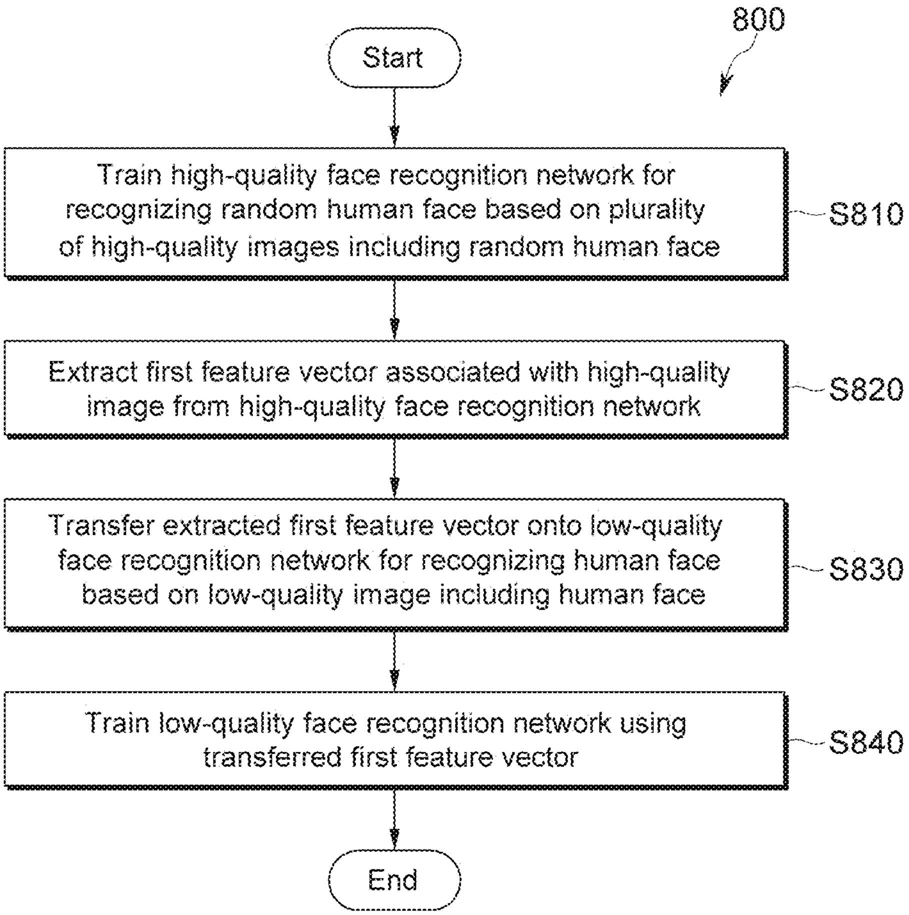
FIG. 8 is a flowchart illustrating an example of a feature vector transfer method according to an example embodiment of the present disclosure.

FIG. 8 is a flowchart illustrating an example of a feature vector transfer method 800 according to an example embodiment of the present disclosure. The feature vector transfer method 800 may be performed by a processor (e.g., at least one processor of a computing device). As shown, the feature vector transfer method 800 may be initiated by the processor training a high-quality face recognition network for recognizing a human face based on a high-quality image including the human face (S810).

The processor may extract a first feature vector associated with the high-quality image from the high-quality face recognition network (S820). In addition, the processor may transfer the extracted first feature vector to a low-quality face recognition network for recognizing a human face based onto a low-quality image including the human face (S830). In this case, the processor may train the low-quality face recognition network using the transferred first feature vector (S840).

The processor may extract the second feature vector from the low-quality face recognition network and train the low-quality face recognition network so that the direction of the second feature vector becomes similar to the direction of the first feature vector by using knowledge distillation. For example, the processor may train the low-quality face recognition network using the sum of the face recognition loss and the distillation loss in the low-quality face recognition network, but is not limited thereto.

The processor may extract a first attention map associated with the high-quality image from the trained high-quality face recognition network, and transfer the extracted first attention map onto the low-quality face recognition network for recognizing the human face based on the low-quality image including the human face. In this case, the processor may train the low-quality face recognition network using the transferred first feature vector and first attention map. For example, the processor may extract a second attention map from the low-quality face recognition network and train the low-quality face recognition network so that the second attention map becomes similar to the first attention map using knowledge distillation.

Figure 9:
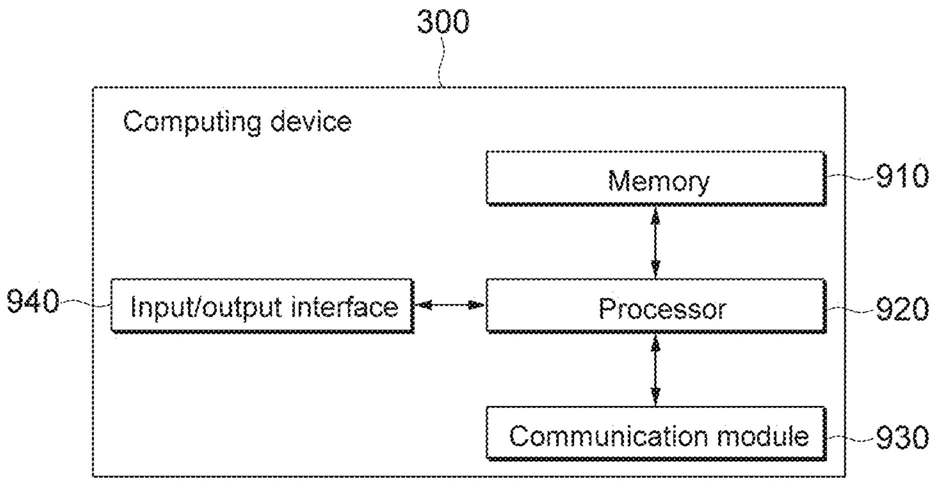
FIG. 9 is a block diagram illustrating an internal configuration of a computing device according to an example embodiment of the present disclosure.

FIG. 9 is a block diagram illustrating an internal configuration of a computing device 300 according to an example embodiment of the present disclosure. The computing device 300 may include a memory 910, a processor 920, a communication module 930, and an input/output interface 940. As shown in FIG. 9, the computing device 300 may be configured to communicate information and/or data over a network using the communication module 930.

The memory 910 may include any non-transitory computer readable storage medium. According to an example embodiment, the memory 910 may include a permanent mass storage device such as random access memory (RAM), read only memory (ROM), disk drive, solid state drive (SSD), flash memory, and the like. As another example, a permanent mass storage device such as a ROM, SSD, flash memory, or disk drive may be included in the computing device 300 as a separate permanent storage device separate from memory. In addition, an operating system and at least one program code may be stored in the memory 910.

These software components may be loaded from a computer-readable recording medium separate from the memory 910. Such a separate computer-readable recording medium may include a recording medium directly connectable to the computing device 300, for example, it may include a computer-readable recording medium such as a floppy drive, a disk, a tape, a DVD/CD-ROM drive, and a memory card. As another example, software components may be loaded into the memory 910 through the communication module 930 rather than a computer-readable recording medium. For example, at least one program may be loaded into the memory 910 based on a computer program installed by files provided by developers or a file distribution system that distributes application installation files through the communication module 930.

The processor 920 may be configured to process commands of a computer program by performing basic arithmetic, logic, and input/output operations. Commands may be provided to a user terminal (not shown) or other external system by the memory 910 or the communication module 930.

The communication module 930 may provide a configuration or function for a user terminal (not shown) and the computing device 300 to communicate with each other through a network, and provide a configuration or function for the computing device 300 to communicate with an external system (e.g., a separate cloud system). As an example, control signals, commands, data, etc., provided under the control of the processor 920 of the computing device 300 may be transmitted to the user terminal and/or external system through the communication module of the user terminal and/or external system via the communication module 930 and the network.

In addition, the input/output interface 940 of the computing device 300 may be connected to the computing device 300 or may be a means for interface with a device (not shown) for input or output that may be included in the computing device 300. In FIG. 9, the input/output interface 940 is illustrated as a component separately configured from the processor 920, but is not limited thereto, and the input/output interface 940 may be included in the processor 920. The computing device 300 may include more components than the components of FIG. 9. However, there is no need to clearly illustrate most of the prior art components.

The processor 920 of the computing device 300 may be configured to manage, process, and/or store information and/or data received from a plurality of user terminals and/or a plurality of external systems.

The above-described methods and/or various example embodiments may be realized with digital electronic circuits, computer hardware, firmware, software, and/or combinations thereof. Various example embodiments of the present disclosure may be executed by a data processing device, e.g., one or more programmable processors and/or one or more computing devices, or be implemented as a computer readable recording medium and/or a computer program stored on a computer readable recording medium. The above-described computer programs may be written in any type of programming language, including compiled or interpreted languages, and may be distributed in any form, such as a stand-alone program, module, or subroutine. A computer program may be distributed over one computing device, multiple computing devices connected through the same network, and/or distributed over multiple computing devices connected through multiple different networks.

The above-described methods and/or various example embodiments may be performed by one or more processors configured to execute one or more computer programs that process, store, and/or manage any function, or the like, by operating on input data or generating output data. For example, the method and/or various example embodiments of the present disclosure may be performed by a special purpose logic circuit such as a field programmable gate array (FPGA) or an application specific integrated circuit (ASIC), and devices and/or systems for performing the methods and/or example embodiments of the present disclosure may be implemented as special purpose logic circuits such as FPGAs or ASICs.

The one or more processors executing the computer program may include a general purpose or special purpose microprocessor and/or one or more processors of any kind of digital computing device. The processor may receive instructions and/or data from each of the read-only memory and the random access memory, or receive instructions and/or data from the read-only memory and the random access memory. In the present disclosure, components of a computing device performing methods and/or example embodiments may include one or more processors for executing instructions, and one or more memory devices for storing instructions and/or data.

According to an example embodiment, a computing device may exchange data with one or more mass storage devices for storing data. For example, the computing device may receive data from a magnetic disc or optical disc and/or transfer data to a magnetic disk or optical disk. A computer readable storage medium suitable for storing instructions and/or data associated with a computer program includes may include, but is not limited to, any type of non-volatile memory including semiconductor memory devices such as erasable programmable read-only memory (EPROM), electrically erasable PROM (EEPROM), and flash memory devices. For example, computer readable storage media may include magnetic disks such as internal hard disks or removable disks, magneto-optical disks, CD-ROM and DVD-ROM disks.

In order to provide interaction with the user, the computing device (e.g., cathode ray tube (CRT), liquid crystal display (LCD), etc.) may include, but is not limited to, a display device for providing or displaying information to a user and a pointing device (e.g., keyboard, mouse, trackball, etc.) for allowing a user to provide input and/or commands, etc., on the computing device. In other words, the computing device may further include any other type of device for providing interaction with a user. For example, the computing device may provide any form of sensory feedback to the user for interaction with the user, including visual feedback, auditory feedback, and/or tactile feedback. In this regard, the user may provide input to the computing device through various gestures such as visual, voice, and motion.

In the present disclosure, various example embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

The computing device based on the example embodiments described herein may be implemented using hardware and/or software configured to interact with a user, including a user device, user interface (UI) device, user terminal, or client device. For example, the computing device may include a portable computing device such as a laptop computer. Additionally or alternatively, the computing device may include, but is not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with the user. Further, the computing device may include a portable communication device (e.g., a mobile phone, smart phone, wireless cellular phone, etc.) suitable for wireless communication over a network, such as a mobile communication network. The computing device may be configured to wirelessly communicate with a network server using wireless communication technologies and/or protocols, such as radio frequency (RF), microwave frequency (MWF), and/or infrared ray frequency (IRF).

Various example embodiments including specific structural and functional details in the present disclosure are exemplary. Accordingly, example embodiments of the present disclosure are not limited to those described above and may be implemented in various different forms. In addition, the terms used in the present disclosure are for describing some example embodiments and are not construed as limiting the example embodiments. For example, words in the singular form and above may be interpreted to include the plural form as well, unless the context clearly dictates otherwise.

In the present disclosure, unless defined otherwise, all terms used in this specification, including technical or scientific terms, have the same meaning as commonly understood by a person of ordinary skill in the art to which such concept belongs. In addition, terms commonly used, such as terms defined in a dictionary, should be interpreted as having a meaning consistent with the meaning in the context of the related art.

Although the present disclosure has been described in relation to some example embodiments in this specification, various modifications and alterations can be made without departing from the scope of the present disclosure that can be understood by a person skilled in the art. In addition, such modifications and alterations are intended to fall within the scope of the claims appended hereto.

What is claimed is:

1. A feature vector transfer method for improving face recognition performance of a low-quality image performed by at least one processor, the feature vector transfer method comprising:

training a high-quality face recognition network for recognizing a human face based on a high-quality image including the human face;

extracting a first feature vector and a first attention map associated with the high-quality image from the high-quality face recognition network;

transferring the extracted first feature vector and the first attention map onto a low-quality face recognition network for recognizing the human face based on a low-quality image including the human face; and training the low-quality face recognition network using the transferred first feature vector and the first attention map, wherein the training of the low-quality face recognition network comprises:

extracting a second feature vector and a second attention map from the low-quality face recognition network;

training the low-quality face recognition network so that a direction of the second feature vector becomes similar to a direction, rather than both the direction and a size, of the first feature vector by using knowledge distillation; and training the low-quality face recognition network so that the second attention map becomes similar to the first attention map by using the knowledge distillation.

2. The feature vector transfer method of claim 1, wherein the training of the low-quality face recognition network so that the direction of the second feature vector becomes similar to the direction of the first feature vector comprises training the low-quality face recognition network using a sum of a face recognition loss and a distillation loss in the low-quality face recognition network.

3. The feature vector transfer method of claim 1, further comprising:

acquiring the high-quality image including the human face;

performing downsampling on the acquired high-quality image;

performing blur processing on the downsampled image; and generating the low quality image by changing a size of the blurred image to a size corresponding to the high quality image.

4. The feature vector transfer method of claim 1, wherein the high-quality face recognition network comprises a plurality of blocks configured to extract the first feature vector of the high-quality image and a plurality of attention modules configured to extract the first attention map.

5. A non-transitory computer-readable recording medium storing instructions for execution by one or more processors that, when executed by the one or more processors, cause the one or more processors to perform the method according to claim 1.

* * * * *